Patented July 21, 1942

2,290,474

UNITED STATES PATENT OFFICE 2,290,474

PHOTOCHEMICAL STABILIZATION

Lowell B. Kilgore, Washington, D. C., assignor to Kilgore Development Corporation, a corporation of Virginia No Drawing. Application August 25, 1939, Serial No. 291,980

6 Claims. (Cl. 260—333)

This invention is to minimize photochemical alteration of esters of mesityl oxide-oxalate and of the class of compounds to which these esters belong.

Esters of mesityl oxide-oxalic acid are useful as insectifuges, or repellants for insects, and the like. They are valuable also as insecticides. They are exposed to sunlight in many instances, often in thin films as, for example, when applied to foliage or to the skin of a person. These compounds are useful for other purposes as well, but for illustration it is sufficient to refer to this use as insectifuge. The efficacy of these compounds depends largely on their remaining in film form on the surface to which they are applied. But it is found that exposure of these films to light from the sun or other sources of actinic radiation induces formation of deterioration products. This photochemical action causes the films to disintegrate into separate particles of solid material. The solid products are relatively ineffective for insectifuge purposes or for many of the other purposes to which esters of mesityl oxide-oxalic acid, for example, are applicable. Similar phenomena occur with bulk quantities of these esters in liquid form, as for example during storage.

A purpose of this invention is to retain the effectiveness of esters of mesityl oxide-oxalic acid and to retain their form as thin films when exposed to light. A further purpose is to prepare solutions containing esters of mesityl oxide-oxalic acid in such form that the solution may be effective as a thin film. A general purpose is to protect these esters in liquid form, whether pure or in solution, so that they will remain liquid throughout rather than develop solid degradation products to separate from the liquid. A particular object is to protect butyl esters of mesityl oxide-oxalic acid from photochemical deterioration. Also an object is to provide photochemically stabilized esters of mesityl oxide-oxalic acid that are compatible and comfortable on the skin of persons to which the composition is applied.

Various objects and benefits of this invention are accomplished by incorporating with esters of mesityl oxide-oxalic acid, esters of $\delta,\epsilon$-substituted-$\alpha$-hydroxy-$\gamma$-keto-$\alpha$, $\delta$-hexadienoic acids. In preferred form this invention is practiced by adding to ester of mesityl oxide-oxalic acid, ester of benzalacetone-oxalic acid in various vehicles but particularly in solutions of water-soluble solvents. This stabilization is effective particularly when the added ester is present in polar solvents, which solvents of themselves are known in the art. In specifically preferred form, for example, normal butyl ester of oxide-oxalic acid is stabilized against photochemical deterioration by 2% or less of butyl ester of benzalacetone-oxalic acid in aqueous ethyl alcohol solution. The formula of esters of benzalacetone-oxalic acid is:

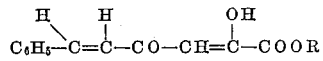

where R is any esterifying group.

The chemical class of these added hexadienoic acids may be represented, and the scope of this invention may be illustrated by the formula:

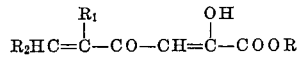

wherein R is any esterifying group, $R_1$ is hydrogen or any alkyl radical, and $R_2$ is any phenylic group. This phenylic group may be the phenyl radical $C_6H_5$ or substituted phenyl group.

The formula above written, strictly speaking, describes an enol tautomer. There is evidence that the compound exists predominantly in this enol form. Nevertheless, this enol form is in dynamic equilibrium with the keto tautomeric form and some of the chemical literature refers to the compound by the keto form. In this specification and claims the enol form is used to describe the compound in that form but include also the tautomeric form. These two tautomers may be represented in a dynamic equilibrium by the formulas in which R, $R_1$ and $R_2$ have the same meaning as above described:

keto

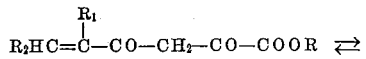

enol

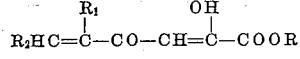

In addition to benzalacetone-oxalate ester a particularly effective actinic stabilizing compound under the present invention is found where in the type of formulas given $R_1$ is a methyl group and $R_2$ a phenyl group. This compound is termed $\alpha$-methyl, $\alpha$-benzalacetone-oxalic acid ester, of which the formula is:

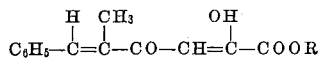

Esters of mesityl oxide-oxalic acid compounds for which these hexadienoic acid esters are effective actinic stabilizing agents may also be expressed as ester of α, α-dimethyl-α'-carboxydihydro-γ-pyrone. For a more elaborate description of the chemical composition of butyl mesityl oxide-oxalic esters see U. S. Patent 2,070,603, page 1, column 1, line 21 to page 2, column 1, line 57.

Particularly effective stabilization is accomplished with the normal butyl esters, the secondary butyl esters, and the iso-butyl esters, though this invention is not limited thereto. The chemical formula of these dihydropyrones may be illustrated by a butyl ester:

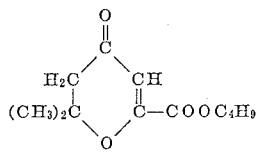

A solution particularly useful against photochemical deterioration is obtained with about 0.25% benzalacetone-oxalate, butyl ester, in ethyl alcohol combined with water in the ratio of about two parts ethyl alcohol to one of water. In this solution may be distributed also the substance to be stabilized; namely, the ester of mesityl oxide-oxalate. A representative composition is:

| | Per cent |
|---|---|
| Butyl ester of benzalacetone-oxalic acid, about | 0.25 |
| Butyl ester of mesityl oxide-oxalic acid, about | 30 |
| Ethyl alcohol, about | 45 |
| Water, about | 25 |

In lieu of ethyl alcohol other alcohols may be used; for example, methyl alcohol or propyl alcohols, others may be available. Or, glycerine, glycol and the like further illustrate water-soluble vehicles for the hexadienoic acids.

It is within the scope of this invention to vary the diluent. More accurately, the system is one in which the variation of one component will alter the others. For example, the ratio of alcohol to water varies inversely as the concentration of the ester of mesityl oxide-oxalic acid. Thus for amounts of the hexadienoic acid ester of between 0.1 and 2.0%, and at about 20° C., a concentration of butyl ester of mesityl oxide-oxalic acid, of 10% requires that the hexadienoic acid ester be distributed in about 50% denatures 95% ethyl alcohol and 40% water; the ester at 30% concentration requires about 40% alcohol and 30% water; at 40% concentration requires about 38% alcohol and 22% water; and at 60% concentration requires about 30% alcohol and 10% water. At lower temperatures additional alcohol, or other solvent, is required—in such amount as yields a clear liquid. At 0° C. about 5% additional alcohol suffices.

As illustrating the usefulness of the present invention, reference is made to an experiment in which the solution above-noted was exposed to sunlight in bottles of glass that transmitted relatively high proportions of ultra violet irradiation, such for example, as bottles of "Corex" glass. For comparison there was exposed in a bottle of "Corex" glass a control solution of the same composition except that it contained no ester of benzalacetone-oxalic acid. After a few days a heavy precipitate of white crystals had formed in the uninhibited control solution containing no ester of benzalacetone-oxalic acid. On the other hand, no precipitate at all was found in the solution inhibited by the ester of benzal- acetone-oxalic acid. The weight of precipitate in the uninhibited solution showed almost complete depletion thereby of the original butyl mesityl oxide-oxalate. Apparently this precipitate is a polymerized form, probably dimerized, of the ester of mesityl oxide-oxalic acid. When this precipitation from solution occurs in a film during use, an undesirable result is alteration of the film to a powder. This not only destroys the continuity of protection over the surface, but the powder is useless or ineffectual.

While this invention has been illustrated with reference to butyl mesityl oxide-oxalate it is intended to include herein other analogous esters inasmuch as they also exhibit photo-deterioration, and are protected by solutions of hexadienoic acid esters as herein disposed. These esters to be protected may include not only the dihydropyrone form, but also the enol or alpha isomers or tautomers. The dihydropyrone form predominates in a dynamic equilibrium with the enol form, and thus in this specification and claims the term is inclusive of both.

Moreover, stabilization is afforded by benzalacetone-oxalic acid in the form of methyl ester, ethyl ester, isopropyl ester, normal propyl ester, secondary and isobutyl ester, as well as normal butyl ester, normal, secondary and isoamyl esters, benzyl ester, cyclohexyl ester, tetrahydrofurfuryl ester, and broadly other alkyl or cyclic esters which need not be enumerated specifically, but will now be apparent to those skilled in this art.

This invention has been described with reference to distributing the hexadienoic acid esters through polar vehicles for protection of ester of mesityl oxide-oxalic acid. These known polar vehicles in this relationship have proved to be exceptionally effective. However, other vehicles are of some use though not preferred according to this invention. For example, hydyrocarbon vehicles are useful. The hydrocarbon is selected appropriately for the general purpose at hand. For example, in an insecticidal spray, excessive volatility is undesirable, or for dermal application too viscous hydrocarbon is undesirable.

Hydrocarbon of the boiling range of kerosene is of wide application under this invention. Especially it has been found satisfactory to use deodorized kerosene as an insecticide spray containing 5% normal butyl ester of mesityl oxide-oxalic acid and containing $\tfrac{1}{10}$% normal butyl ester of benzalacetone-oxalic acid. This combination exhibits considerable photochemical stability of the mesityl oxide-oxalic acid ester when the benzalacetone-oxalic acid ester is present.

Also, vegetable oils are useful in some degree as a vehicle for ester of benzalacetone-oxalic acid. For example castor oil containing 30% butyl ester of mesityl oxide-oxalic acid, is improved in photochemical stability when there is present also about 0.25% butyl ester of benzalacetone-oxalic acid. Similarly olive oil, corn oil, soya oil have been found to be useful distributing agents.

For some purposes it is suitable that the oil, for example castor oil, contain some amount of aqueous vehicle; for example, aqueous alcohol, or it may contain only alcohol. For further example, a solution having useful actinic resistance is obtained with corn oil in proportion of about 5 to 10% in isopropyl alcohol. This solution may contain some amount of water. It will contain ester of mesityl oxide oxalic acid and ester of benzalacetone-oxalic acid, as previously described herein.

Further illustrating the ramifications of this invention, are applications, of somewhat diminished efficacy, or ester of benzalacetone-oxalic acid in which that ester is interposed in gross between a source of photochemical radiation and the ester of mesityl oxide-oxalic acid to be protected, but without inter-mixture of the two.

Thus a container of a thin layer of the ester of benzalacetone-oxalic acid may surround a body of ester of mesityl oxide-oxalic acid, as where a separate screen surrounds a bottle containing the ester that would otherwise deteriorate in sunlight.

It has been found that the ester of benzalacetone-oxalic acid may be intermixed with vehicles that are also solvents for cellulose esters or ethers, such as for cellulose acetate for example. This menstruum then may be applied to a sheet of cellulose acetate or analogous sheet, or may be interposed between two such sheets to form a screen that is effective in some degree to protect esters of mesityl oxide-oxalic acid. Or a lacquer containing the ester of benzalacetone-oxalic acid may be applied directly to the object containing the ester of mesityl oxide-oxalic acid to be protected. Likewise, it is intended to include within the scope of this invention oleaginous emulsions or creams of oils, waxes, etc., which contain ester of mesityl oxide-oxalic acid stabilized against photochemical deterioration by ester of benzalacetone-oxalic acid. Such are comprehended herein by the term oleaginous vehicles.

However, while these examples are presented to illustrate the breadth of the present invention, nevertheless, it is preferred because of exceptional efficacy to distribute ester of benzalacetone-oxalic acid in a polar vehicle as herein described.

While in accordance with the patent statutes this invention has been illustrated in its breadth and principles by reference to examples that are preferred at present, it will now be apparent to those skilled in the art that other modifications and specific applications of this invention may be made within the scope of the appended claims.

What I claim is:

1. A new composition of matter comprising butyl ester of mesityl oxide-oxalic acid, containing in solution ester of the formula:

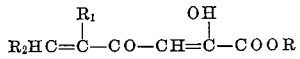

wherein R is any esterifying group, $R_1$ is hydrogen or any alkyl radical and $R_2$ is any phenylic group, the latter being in minor and light-stabilizing amounts up to the order of about 2 percent.

2. A new composition of matter comprising butyl ester of mesityl oxide-oxalic acid, containing in solution ester of the formula:

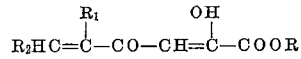

wherein R is any esterifying group, $R_1$ is hydrogen or methyl radical and $R_2$ is any phenylic group, the latter being in minor and light-stabilizing amounts up to the order of about 2 percent.

3. A new composition of matter comprising butyl esters of mesityl oxide-oxalic acid, containing in solution ester of the formula:

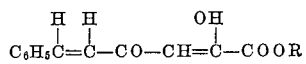

wherein R is any esterifying group, the latter being in minor and light-stabilizing amounts up to the order of about 2 percent.

4. A new composition of matter comprising butyl ester of mesityl oxide-oxalic acid, containing in solution butyl ester of the formula:

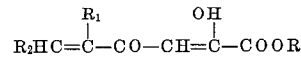

wherein R is any esterifying group, $R_1$ is hydrogen or any alkyl radical, and $R_2$ is any phenylic group, the latter being in minor and light-stabilizing amounts up to the order of about 2 percent.

5. A process of protecting compounds of the class of butyl ester of mesityl oxide-oxalic acid against photochemical alteration comprising dissolving therein minor and light-stabilizing amounts up to the order of about 2 percent of an ester of the formula:

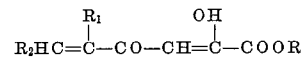

wherein R is any esterifying group, $R_1$ is hydrogen or any alkyl radical and $R_2$ is any phenylic group.

6. A new composition of matter comprising butyl ester of benzalacetone-oxalic acid dissolved in butyl ester of mesityl oxide-oxalic acid the former being present in minor and light-stabilizing amounts up to the order of about 2 percent.

LOWELL B. KILGORE.